April 15, 1952        T. T. SHORT        2,593,206
SENSING DEVICE FOR SORTING APPARATUS
Filed Jan. 6, 1950
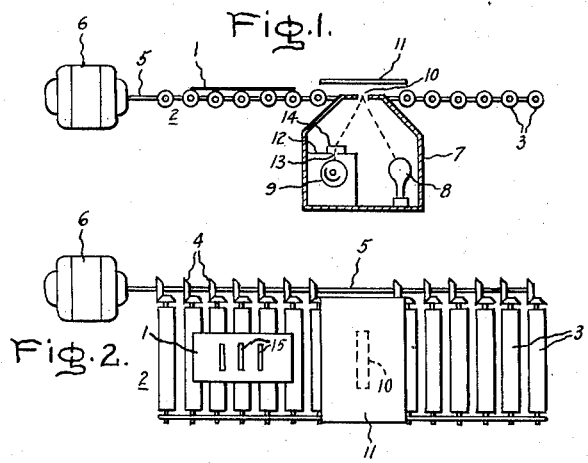
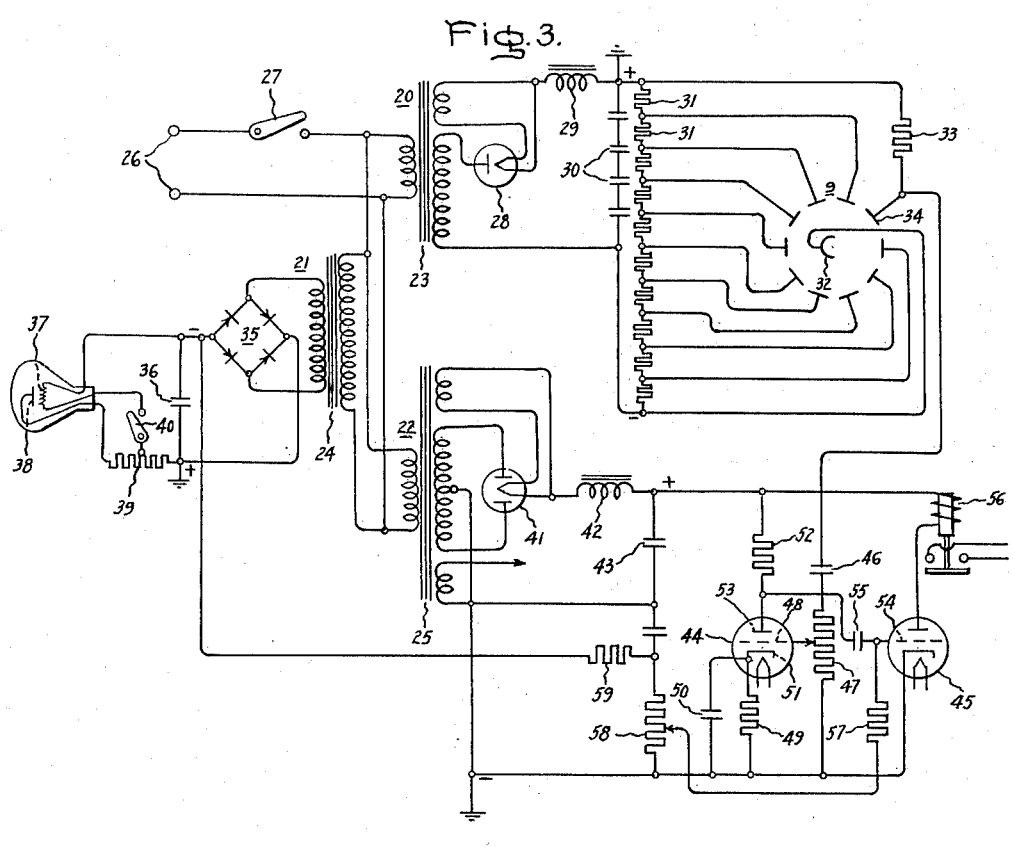
Inventor:
Thomas T. Short,
by Paul A. Frank
His Attorney.

Patented Apr. 15, 1952

2,593,206

UNITED STATES PATENT OFFICE 2,593,206

SENSING DEVICE FOR SORTING APPARATUS

Thomas T. Short, Schenectady, N. Y., assignor to General Electric Company, a corporation of New York Application January 6, 1950, Serial No. 137,173

2 Claims. (Cl. 250—52)

My invention relates to sorting apparatus and more particularly to sensing devices for sorting apparatus whereby information of a predetermined characteristic of an instrument to be sorted may be gathered and transmitted to a suitable sorting machine.

Most sensing devices for sorting apparatus which have heretofore been devised have been operative in response to different sizes and shapes of the instrument to be sorted or to predetermined alterations such as visible markings or perforations. In certain sorting applications, however, such as, for example, in sorting negotiable instruments such as bank checks according to denomination, the instruments to be sorted all have the same size and shape, and it is desirable that no visible alterations in the form of extraneous markings or perforations be made since in banking practice such alterations commonly denote cancellation of the check.

Accordingly, a principal object of my invention is to provide a new device for sensing a predetermined characteristic of an instrument which requires no visible alterations, markings or perforations of the instrument.

Another object is to provide a highly sensitive device for sensing a predetermined characteristic by which an instrument is to be sorted, even though the instrument has been roughly handled or somewhat mutilated by prolonged circulation.

A further object of my invention is to provide a simple and economical sensing device capable of receiving information concerning a predetermined characteristic of an instrument to be sorted and of relaying this information in translatable coded form to a conventional sorting apparatus.

In general, my invention comprises the marking of an instrument to be sorted with invisible characters which fluoresce under the influence of incident ultra violet light rays. The instrument is passed through ultra violet light rays in the presence of a light receiving photoelectric element which translates the amount and/or number of fluorescent light occurrences into a representative electric signal which can be amplified and employed to energize a sorting apparatus.

In a preferred embodiment of my invention, the instrument to be sorted is marked with a series of invisible fluorescent bars and passed over an aperture of a light impervious container housing an ultra violet light source and a photoelectric element. The fluorescent light pulses reflected from the bars as the instrument is moved across the aperture are directed toward the photoelectric element which is connected to produce electrical pulses in accordance with the fluoresent light pulses. The electrical pulses are amplified and employed to actuate a suitable sorting machine.

The novel features which I believe to be characteristic of my invention are set forth with particularity in the appended claims. My invention itself, however, together with further objects and advantages thereof can best be understood by reference to the following description taken in connection with the accompanying drawings in which Fig. 1 is a cross-sectional diagrammatic view of a sensing device embodying my invention and employed to sense the denomination of travelers' bank checks, Fig. 2 is a plan view of the device shown in Fig. 1, and Fig. 3 is a circuit diagram illustrating a preferred circuit connection for the elements shown in Fig. 1 as well as a preferred amplification system of the electrical pulses derived therefrom.

Referring to Fig. 1 and Fig. 2, I have shown in simplified diagrammatic form a sectional side view and plan view respectively of a check denomination sensing device embodying my invention. A check 1 is placed upon a roller conveyer system 2 whose separate roller elements 3 are driven at uniform speed through separate gears 4 secured to a common drive shaft 5 of a drive motor 6. A light impervious container 7 housing an ultra violet light source 8 and a photoelectric element 9 is located along the conveyer line and has an aperture 10 preferably in the form of transverse slot arranged to confine light from said ultra violet source into a beam communicating with one side of the check 1 as it is propelled past the container 7 by the roller conveyer system 2. The ultra violet light source 8 and the photoelectric element 9 are placed within container 7 at approximately equal angles from a line passing through the center of the aperture 10 and normal to the plane thereof in order that the angle of light reflection from a surface covering the aperture 10 is equal to the angle of incidence. A light shield 11 is located immediately above the aperture 10, as illustrated in Figs. 1 and 2, in order to minimize the amount of extraneous light admitted into container 7 through aperture 10; and check 1 passes intermediate this light shield 11 and aperture 10 during its progress down the conveyer line.

In order to limit the field of view of the photoelectric element 9 so that it is responsive only to light emanating from a direction represented by the angle of reflection, the photoelectric element 9 is encased in a light shielding member 12 and faces a hole 13 in the light shielding member 12 which is aligned with the reflected light. Covering hole 13 is a light filter 14 which admits into the compartment formed by the shielding member 12 only the particular color of light which emanates from the type of invisible fluorescent material with which the check 1 is marked, as will be more fully explained hereinafter. The light filter 14 is, of course, impervious to ultra violet light so that the photoelectric element 9 is not affected by the ultra violet light rays emitted from the source 8.

At least one and preferably both faces of the check 1 are marked with invisible material which has the property of visible, preferably monochromatic, fluorescence under the influence of ultra violet light. One such material which has been found to be excellent for the purpose is an organic compound "esculin" which may be printed on the check while in a colorless ink-type solution and which flouresces a bright blue light when subjected to ultra violet light. Other invisible fluorescent materials are well known and need not be listed here. It will be appreciated that the type of light filter 14 which is employed will depend upon the type of fluorescent material with which the check is marked.

The invisible markings on the check take the form of transverse bars 15, best seen in Fig. 2, which are spaced along the length of the check 1. The number and/or spacing of these bars can be arranged in accordance with any predetermined code. I have found, however, that the most positive and reliable sensing action is accomplished if the sorting equipment is responsive only to the number of bars employed and if the bars are fairly thick and spaced by a distance many times their thickness. One bar, for example, might indicate a check denomination of $10.00, two bars $20.00, and so forth limited only by the length of the check.

Referring now to Fig. 3, I have shown a circuit diagram of the sensing device of Figs. 1 and 2. Three separate direct current power supplies 20, 21 and 22 are energized through three separate power transformers 23, 24 and 25 whose respective primary windings are connected in parallel across a pair of alternating current source terminals 26 through a main power switch 27. The power supply 20 provides the operating voltages for the photoelectric element 9 which may conveniently be a secondary emission multiplying photoelectric discharge device as indicated in Fig. 3. The power supply 20 comprises a half wave rectification element 28, a filter choke 29, a plurality of series connected filter capacitors 30 and a multiple-tapped voltage dividing resistance 31 connected in a conventional half wave rectifying circuit. One end of the resistance 31 is connected to a photo-sensitive cathode 32 while the other end of the resistance 31 is connected through a load resistance 33 to a furthermost anode 34 of the "photo-multiplier" discharge device 9. The anode connected end of the resistance 31 is grounded with the result that the cathode 32 is maintained at a highly negative potential with respect to the anode 34. As is conventional, the successively positioned anodes of the photo-multiplier discharge device 9 are connected to correspondingly tapped voltage points on the bleeder resistance 31 as indicated.

The ultra violet light source 8 obtains its operating voltages from the power supply 21 which preferably comprises an alternating current rectifying bridge 35 and a filter capacitor 36 connected in a conventional full wave rectification circuit across the secondary of the power transformer 24. The ultra violet light source 8 may conveniently be any conventional type such as a quartz lamp containing a filament 37 and an anode 38. One end of the filament 37 is connected to the negative side of the bridge rectifier 35 while the anode 38 is connected through a tapped resistance 39 to the positive side of the bridge rectifier which is grounded. The other end of the filament 37 is connected through an energizing switch 40 to the tap point of resistance 39 in order that the proper voltage difference may be applied between filament 37 and anode 38 when switch 40 is closed.

The third power supply 22 utilizes a double diode electric discharge device 41 together with a filter choke 42 and a filter capacitor 43 connected in a conventional full wave rectification network and supplies the operating voltages for a pulse amplifying network employed to amplify the electric impulses produced by the photoelectric element 9. In this case, however, the negative terminal of the power supply 22 is grounded.

The pulse amplifying network comprises two stages of pulse amplification associated with triode discharge devices 44 and 45. The output signal from the photoelectric element 9 is supplied to the pulse amplifier through a coupling capacitor 46 connected between anode 34 of the photoelectric element 9 and one end of a potentiometer 47 whose other end is connected to ground. The signal voltage developed across potentiometer 47 is applied to a control electrode 48 of the discharge device 44 through the adjustable tap connection of the potentiometer 47. A cathode biasing network for discharge device 44 comprises a resistance 49 and a capacitor 50 connected in parallel between cathode 51 of the discharge device 44 and ground. The output voltage of this stage of amplification is taken across a load resistance 52 connected from an anode 53 of the discharge device 44 to the positive side of the power supply 22, and is supplied to a control electrode 54 of the triode discharge device 45 through a coupling capacitor 55. The cathode of this latter discharge device 45 is directly connected to ground while the anode of device 45 is connected through a suitable load device 56, which may conveniently be a relay, as indicated, to the high positive voltage from the power supply 22.

In order to maintain the discharge device 45 in a normally non-conducting state, an adjustable negative biasing voltage is applied to the control electrode 54 of the device 45 by a connection through a grid resistance 57 to a variable tap of a potentiometer 58 which comprises one element in a voltage dividing network including a resistance 59 and potentiometer 58 connected in series from the negative end of the ultra violet lamp power supply 21 to ground. It will be appreciated that by adjusting the position of the tap of potentiometer 58, the voltage on the control electrode of the discharge device 45 may be adjusted to any desired value beyond the discharge cut-off point of the device 45.

In the operation of my above-described sensing device, switches 27 and 40 are closed thereby lighting the ultra violet lamp 8 and applying the proper operating voltages to the photoelectric element 9 and the pulse amplifying network. The motor 6 is energized to start the roller conveyer system 2, and a properly marked check 1 is placed on the rollers so that its longitudinal axis coincides with the direction of its conveyed motion. If the check has been similarly marked on both faces, it may be placed in this manner upon the rollers 3 without further regard to its orientation. As the check 1 passes over aperture 10 of container 7, successive pulses of fluorescent light are reflected from the bars 15 and impinge upon the photoelectric element 9 through the light filter 14 and hole 13. Each fluorescent light pulse causes a momentary increase of electronic emission from cathode 32 to anode 34 of photoelectric element 9 which, in turn, causes a pulse of electric current through load resistance 33 producing a negative going voltage pulse at anode 34. This negative pulse is coupled through capacitor 46 and potentiometer 47 to control electrode 48 of triode discharge device 44 which is connected in a conventional voltage amplifying and inverting stage to produce an amplified positive-going pulse at anode 53 of device 44. This positive going pulse is delivered through capacitor 55 to control electrode 54 of the output stage discharge device 45 which is normally biased beyond the discharge cut-off point. The positive-going signal functions to raise the voltage on control electrode 54 into the current conduction region of discharge device 45 in order to enable current to flow through load device 56 connected in the anode-to-cathode circuit of discharge device 45. It is to be understood, of course, that although I have shown a load device comprising a relay which may close, for example, a counting circuit of a suitable sorting machine, many other load devices which translate the amplified electrical current pulses produced in the anode-to-cathode circuit of discharge device 45 into useful mechanical or electrical signals may alternatively be provided. Suitable sorting machines which convey the check into a proper bin in accordance with a predetermined number of electrical or mechanical signals are well known in the art and need not be described here.

I have also found that extremely sensitive operation of the above described sensing device may be obtained if the underside of the light shield 11 is made to have substantially the same reflectance as the unmarked check 1. The various controls of the sensing device are then adjusted so that the output discharge device 45 is held just at the threshhold of operation, and the slightest increase in light intensity falling upon the photoelectric element 9 causes current conduction in the discharge device with the consequent operation of load device 56. Under such conditions it has been found that reliable operation may be obtained even though over 80% of the fluorescent material has been obscured or worn away. Such a complete obliteration of the invisible markings takes many years of normal check handling while in circulation.

It is to be understood that while I have shown a particular apparatus embodying my invention, many modifications can be made, and I, therefore, intend by the appended claims to cover all such modifications as fall within the true spirit and scope of my invention.

What I claim as new and desire to secure by Letters Patent of the United States is:

1. A device for sensing the denomination of an instrument comprising the combination of at least one bar of invisible material marked on each face of said instrument, said material having the property of visible monochromatic light fluorescence when subjected to incident ultra violet light, and the number of said bars constituting a code representing said denomination, a light impervious container having an aperture therethrough, a light shield extending across and slightly above said aperture to minimize the admittance of extraneous light through said aperture into said container, the undersurface of said light shield having substantially the same reflectance as said instrument faces, an ultra violet light source and a photoelectric element arranged within said container so that incident light from said ultra violet light source striking a surface covering said aperture is reflected toward said photoelectric element, a light filter admissive only to said monochromatic light located to intercept said reflected light, light shielding means enclosing said photoelectric element so that said photoelectric element is subjected only to light transmitted through said light filter, an electric circuit connected to be controlled by the conduction of said photoelectric element, and means for propelling a marked face of said instrument over said aperture to produce a pulse of fluorescent light reflected from said bar which increases the conduction of said photoelectric element accordingly.

2. A device for sensing the denomination of an instrument comprising the combination of a plurality of spaced bars of invisible material marked on each face of said instrument, said material having the property of visible monochromatic light fluorescence when subjected to incident ultra violet light and the number of said bars constituting a code representing said denomination, a light impervious container having an aperture therethrough, a light shield extending across and slightly above said aperture to minimize the admittance of extraneous light through said aperture into said container, the undersurface of said light shield having substantially the same reflectance as said instrument faces, an ultra violet light source and a photoelectric element within said container, said photoelectric element being enclosed in a light impervious compartment having a small hole therein, said photoelectric element and said compartment hole being aligned to receive light reflected from a surface covering said aperture and subjected to incident light from said ultra violet source, a light filter admissive only to said monochromatic light covering said compartment hole, means for propelling said instrument between said light shield and said aperture of said container to pass said bars in succession over said aperture to produce pulses of said monochromatic light which impinge upon said photoelectric element, and an electric pulse amplification circuit connected to be controlled by the conduction of said photoelectric element.

THOMAS T. SHORT.

REFERENCES CITED

The following references are of record in the file of this patent:

UNITED STATES PATENTS

| Number | Name | Date |
|---|---|---|
| 2,056,382 | Ayres et al. | Oct. 6, 1936 |
| 2,262,492 | Farrell | Nov. 11, 1941 |
| 2,263,108 | Stuart | Nov. 18, 1941 |
| 2,267,758 | Sell | Dec. 30, 1941 |
| 2,285,296 | Maul | June 2, 1942 |
| 2,294,720 | Dickinson | Sept. 1, 1942 |
| 2,438,588 | Tolson | Mar. 30, 1948 |